(12) United States Patent
Mahajan et al.

(10) Patent No.: US 8,768,074 B2
(45) Date of Patent: Jul. 1, 2014

(54) IDENTIFICATION AND ANALYSIS OF CADENCE PATTERN IN VIDEO

(75) Inventors: Praney Mahajan, Uttar Pradesh (IN); Shekhar Madnani, Uttar Pradesh (IN)

(73) Assignee: Interra Systems Inc., Cupertino, CA (US)

( * ) Notice: Subject to any disclaimer, the term of this patent is extended or adjusted under 35 U.S.C. 154(b) by 37 days.

(21) Appl. No.: 13/549,507

(22) Filed: Jul. 15, 2012

(65) Prior Publication Data

US 2013/0259392 A1     Oct. 3, 2013

(30) Foreign Application Priority Data

Apr. 2, 2012   (IN) .......................... 1010/DEL/2012

(51) Int. Cl.
*G06K 9/46*        (2006.01)
(52) U.S. Cl.
USPC ........... 382/232; 382/233; 382/250; 382/251; 382/236
(58) Field of Classification Search
CPC ... H04N 7/0127; H04N 7/013; H04N 7/0135; H04N 7/012; H04N 19/00; G06K 9/36
USPC .......................... 382/232, 233, 236, 250, 251; 348/400.1, 401.1, 402.1, 403.1, 412.1, 348/415.1

See application file for complete search history.

(56) References Cited

U.S. PATENT DOCUMENTS

| 2005/0168634 | A1* | 8/2005 | Wyman et al. ................ 348/448 |
| 2007/0052846 | A1* | 3/2007 | Adams .......................... 348/452 |
| 2008/0062308 | A1* | 3/2008 | Zhai et al. .................... 348/448 |

* cited by examiner

*Primary Examiner* — Ali Bayat
(74) *Attorney, Agent, or Firm* — Benjamin A. Balser; Balser & Grell IP Law

(57) ABSTRACT

A system and method for the identification and analysis of cadence pattern is disclosed. The method uses previous and current fields to generate the difference between the field values. The difference of these values along with the field relations is passed to the state machine to generate the state of the top and bottom fields. Based on the top and bottom state the cadence signature is generated and by using the Fourier analysis the principle frequency of repeated cadence pattern signature sequence is identified. Each of the cadence signatures present in the cadence pattern signature sequence is decoded to calculate the pull-down value of the cadence pattern. The pull down value then gives the actual cadence pattern.

26 Claims, 10 Drawing Sheets

IDENTIFICATION AND ANALYSIS OF CADENCE PATTERN IN VIDEO

This application claims priority from Indian application 1010/DEL/2012 titled "IDENTIFICATION AND ANALYSIS OF CADENCE PATTERN IN VIDEO" and filed on Feb. 4, 2012.

TECHNICAL FIELD

The embodiments herein relate to video analysis in Telecine and, more particularly, to identification of cadence pattern in video analysis.

BACKGROUND

With the advent of broadcast television, movie producers realized they needed more than live television programming. By turning to film-originated material, they would have access to the wealth of films made for the cinema in addition to recorded television programming on film that could be broadcasted over the airwaves at different times. Moving picture video is typically recorded or encoded at a pre-determined frame rate. For example, cinema films are typically recorded at a fixed rate of 24 frames per second (fps). Video as broadcast for television in accordance with the NTSC standard, on the other hand, is encoded at 30 fps. Video broadcast in accordance with European PAL or SECAM standards is encoded at 25 fps. However, the difference in frame rates between film generally (24 frames/s) and for television (30 or 25 frames/s) meant that simply playing a film onto a television camera would result in flickering when the film frame was changed in mid-field of the TV frame.

In recent decades, telecine which is primarily a film-to-videotape process, as opposed to film-to-air is employed. The most complex part of telecine is the synchronization of the mechanical film motion and the electronic video signal. Every time the video part of the telecine samples the light electronically, the film part of the telecine must have a frame in perfect registration and ready to photograph. This is relatively easy when the film is photographed at the same frame rate as the video camera will sample, but when this is not true, a sophisticated procedure is required to change frame rate.

Conversion between frame rates has created challenges. One common technique of converting frame rates involves dropping or repeating frames within a frame sequence. For example, a 3:2 pull down is used to convert 24 fps motion picture video to 30 fps or 60 fields per second. Each first frame spans 3 video fields, while each other second frame spans two fields. For instance, a cycle that starts with film frame B yields a 3:2 pattern: B-B-B-C-C-D-D-D-A-A or 3-2-3-2 or simply 3-2. In other words, there is no difference between the 2-3 and 3-2 patterns.

In video, the cadence pattern or telecine information is identified and detected Telecine information is useful for identifying system issues during media processing such as editing, transcoding and so on. It is important to correctly identify the cadence pattern in video even in case of noise, freeze frames, slow motion and complicated video sequences.

Existing methods for identification of cadence pattern and analysis are capable of detecting only one particular type of cadence pattern in the video. When the pattern sequences are complex or large there is every possibility of incorrect patterns or sequence being captured. In addition, there are no means to cross check such errors in identification of the sequence. In addition, most of the methods employed today are prone to noise, slow motion and have difficulty in eliminating freeze frames. Further, these methods are cumbersome in nature. Some of the methods may also require the system to be trained initially as a result making the overall process time consuming.

Due to the above stated reasons there is a need for generic algorithm to be able to detect any kind of cadence pattern in the video including complex sequences without errors. Further, the method must be efficient and free from initial training requirements.

SUMMARY

In view of the foregoing, an embodiment herein provides a method for cadence sequence identification and analysis in a video stream. The method comprising encoding cadence signature for output data obtained from a state machine by a cadence signature generator module, analyzing the encoding cadence signature output from the cadence signature generator module by a data analyzer module and decoding the signature and identifying pull-down values for cadence pattern estimation by a cadence pattern estimator module.

Embodiments further disclose a system for cadence sequence identification and analysis in a video stream. The system provided with at least one means configured for encoding cadence signature for output data obtained from a state machine by a cadence signature generator module, analyzing the encoding cadence signature output from the cadence signature generator module by a data analyzer module and decoding the signature and identifying pull-down values for cadence pattern estimation by a cadence pattern estimator module.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
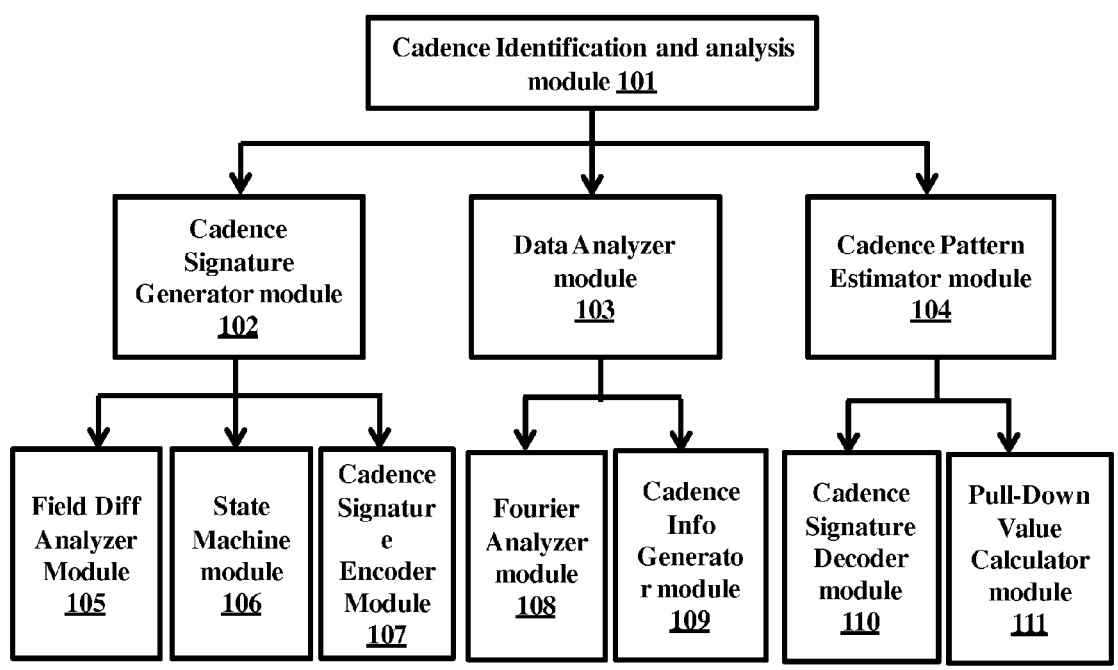
FIG. 1 illustrates a general block diagram of the modules in the process of identification of cadence pattern, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a system and method of identification and analysis of cadence pattern in the video. Referring now to the drawings, and more particularly to FIGS. 1 through 9, where similar reference characters denote corresponding features consistently throughout the figures, there are shown embodiments.

FIG. 1 illustrates a general block diagram of the modules in the process of identification of cadence pattern, according to embodiments as disclosed herein. The system and method for the identification and analysis of cadence pattern comprises plurality of modules in the hierarchy depicted in the FIG. 1. Cadence Identification and analysis module 101 has a plurality of modules and sub-modules to identify the type of cadence pattern in the video. The cadence identification and analysis module 101 comprise of cadence signature generator module 102, data analyzer module 103 and cadence pattern estimator module 104. The cadence signature generator module 102 generates the cadence signature using three sub-modules such as field difference analyzer module 105, state machine module 106 and cadence signature encoder module 107. Data Analyzer module 103 comprises two sub-modules such as Fourier analyzer module 108 and cadence info generator module 109. Cadence pattern estimator module 104 comprises two sub-modules such as Cadence signature decoder module 110 and Pull-Down value calculator module 111. Using the abovementioned modules the system is able to identify complex cadence patterns by employing a generic algorithm. The detected cadence pattern is useful for identifying system issues during media processing such as editing, transcoding and so on. It is important to correctly identify the cadence pattern in video even in case of noise, freeze frames, slow motion and complicated video sequences. Additionally, the application is also useful in identifying any change in cadence pattern in a video sequence.

Figure 2A:
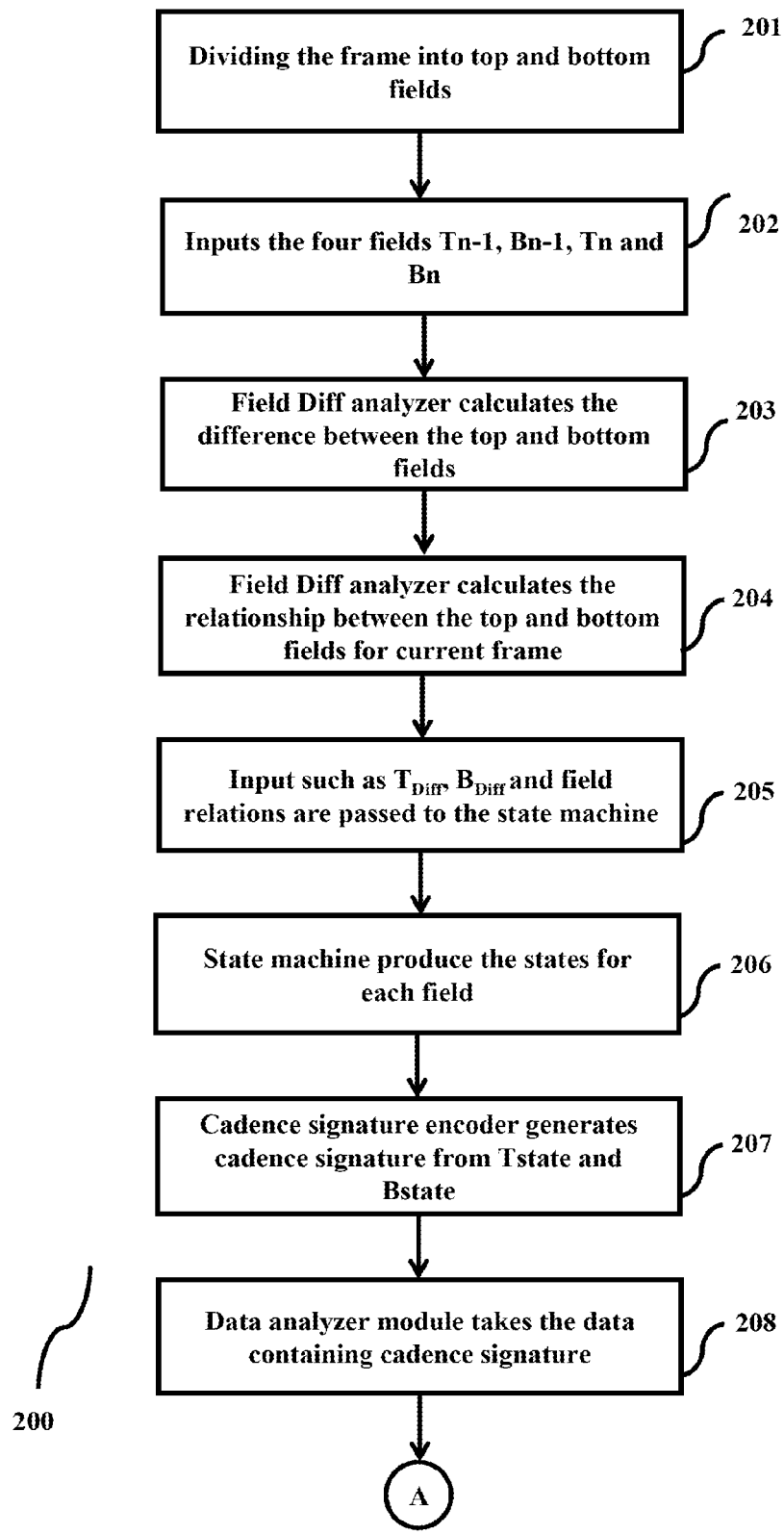
FIG. 2A and FIG. 2B collectively represent a flowchart illustrating the algorithm used in the identification of cadence pattern, according to embodiments as disclosed herein.
Figure 2B:
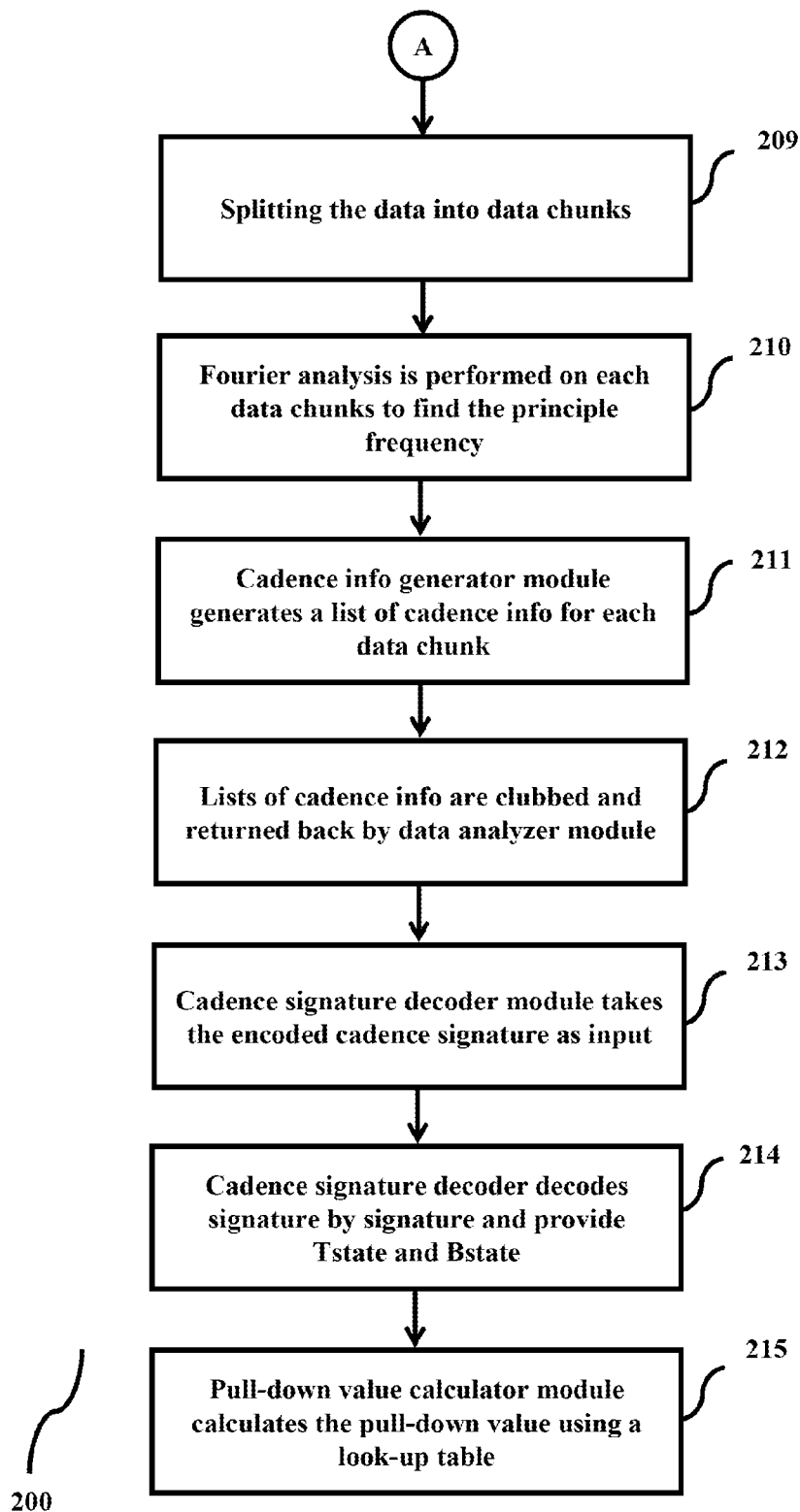

FIG. 2A and FIG. 2B collectively represent a flowchart illustrating the algorithm used in the identification of cadence pattern, according to embodiments as disclosed herein. The method begins at FIG. 2A which employs an algorithm for identification and analysis of cadence patterns in the video. The algorithm first divides (201) a video frame into top and bottom fields represented as T and B. At any time-instance n, the cadence signature generator module 102 takes (202) as input the four fields Tn, Bn (top and bottom fields of current frame) and Tn−1, Bn−1 (top and bottom fields of previous frame) and gives the generated cadence signature as output. The field difference analyzer module 105 then calculates (203) the difference between the top and bottom fields for the frames. Further, the field difference analyzer module 105 calculates (204) the relationship between the top and bottom fields for current frame. From the diff analyzer module 105 the value of $T_{Diff}$, $B_{Diff}$ and field relations are passed (205) as inputs to the state machine module 106. The state machine module 106 takes these inputs and produces (206) the states for each field such as Tstate and B state respectively. Further, the Cadence signature encoder module 107 generates (207) cadence signature from Tstate and Bstate. From the generated cadence signature, data analyzer module 103 takes (208) the data containing cadence signature. Further, as illustrated in FIG. 2B, the data analyzer module splits (209) the data into a plurality of data chunks. Fourier analyzer module 108 in the data analyzer module performs (210) the Fourier analysis on each data chunks to identify the principle frequency of repetition in the pattern. Then cadence info generator module 109 in the data analyzer module generates (211) the cadence info for each data chunk. The data analyzer module 103 clubs (212) the list of cadence info nodes and returns back the info. Cadence signature decoder module 110 in the cadence pattern estimator module 104 takes (213) the encoded cadence signature as input and decodes (214) signature by signature and provides Tstate and Bstate. Further, the Pull-down value calculator module 111 calculates (215) the pull-down value of the cadence pattern using a look-up table. As a result, the repeated pattern is identified. The various actions in method 200 may be performed in the order presented, in a different order or simultaneously. Further, in some embodiments, some actions listed in FIG. 2A and FIG. 2B may be omitted.

Figure 3:
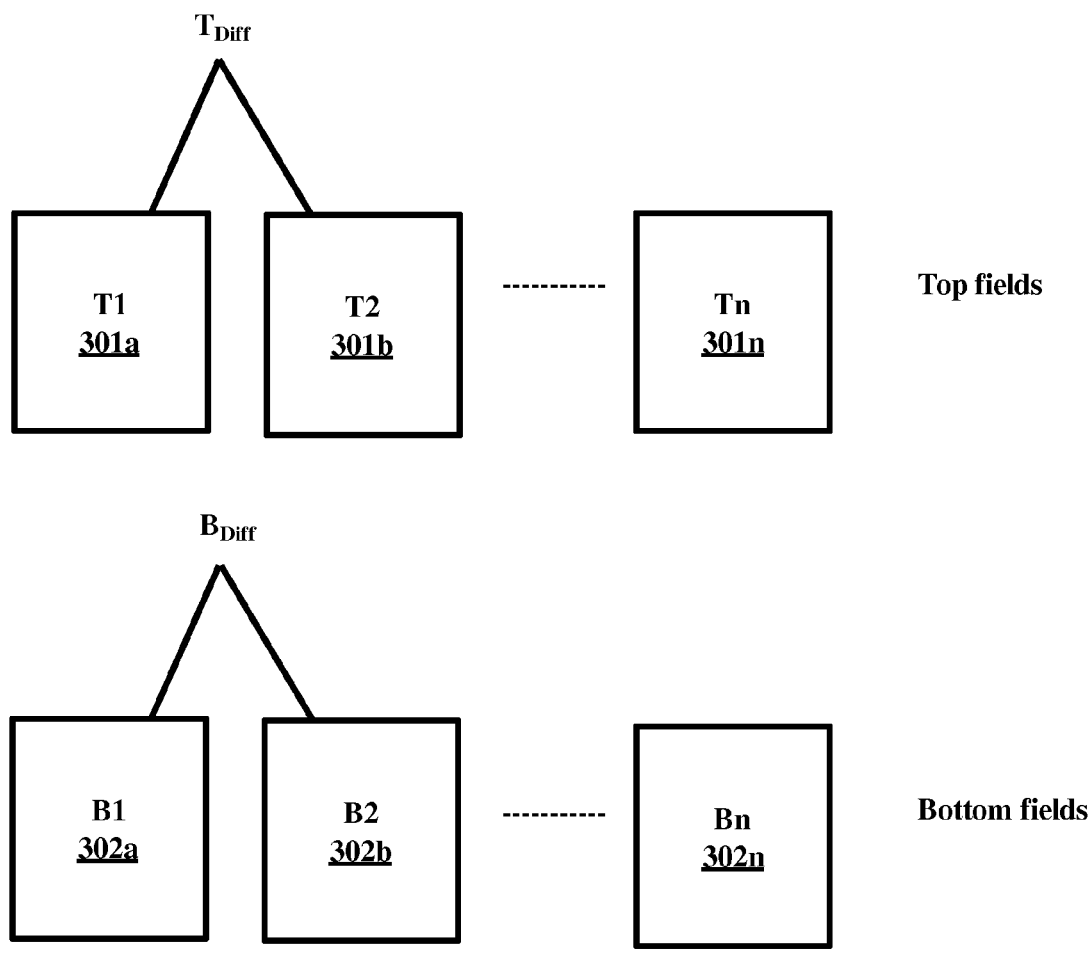
FIG. 3 illustrates the function of field difference analyzer module that calculates the difference between the previous and current fields, according to embodiments as disclosed herein.

FIG. 3 illustrates the function of field difference analyzer module that calculates the difference between the previous and current fields, according to embodiments as disclosed herein. As depicted in the figure the top and bottom fields of the frames are separated and the difference between the current and previous top fields is calculated. For example, the previous top field 301a is T1 and the current top field 301b is T2. The difference between the previous and current top fields ($T_{Diff}$) is calculated in the field difference analyzer module 105. The video frames may include 'n' number 301n of top fields as depicted in the figure. The field difference analyzer module also calculates the difference between the bottom fields in the frame. For example, the previous and the current bottom field in the frame are represented as B1 and B2 respectively. The field difference analyzer module 105 calculates the difference ($B_{Diff}$) between the previous bottom field 302a and the current bottom field 302b. The video frames may include 'n' number 302n of bottom fields in the video frame. The field difference analyzer module 105 calculates the difference of the previous and current top fields and bottom fields separately. In one embodiment, the field difference analyzer module 105 calculates the field relationship between the top and bottom fields ($F_{Relation}$) for the current frame. The field relations of a frame at time instance n, is indicated in the table 1 and the description of the field relation is described in table 2.

TABLE 1

Field relation ($F_{Relation}$) for a frame at time-instance n (Fn)

| Frames Sequence at time instance n | | Field Relation |
|---|---|---|
| $T_{n-1}$ | $T_n$ | NA |
| $B_{n-1}$ | $B_n$ | |
| $T_{n-1}$ | $T_n$ | REL_FIELDS_1 |
| $B_{n-1}$ | $B_{n-1}$ | |
| $T_{n-1}$ | $T_n$ | REL_FIELDS_2 |
| $B_n$ | $B_n$ | |
| $T_{n-1}$ | $T_{n-1}$ | REL_FIELDS_1 |
| $B_{n-1}$ | $B_n$ | |
| $T_n$ | $T_n$ | REL_FIELDS_2 |
| $B_{n-1}$ | $B_n$ | |
| $T_n$ | $T_n$ | NA |
| $B_n$ | $B_n$ | |

TABLE 1-continued

Field relation ($F_{Relation}$) for a frame at time-instance n (Fn)

| Frames Sequence at time instance n | | Field Relation |
|---|---|---|
| $T_{n-1}$ $B_{n-1}$ | $T_{n-1}$ $B_{n-1}$ | NA |

TABLE 2

Description of each type of Field relation ($F_{Relation}$)

| Field Relation | Description |
|---|---|
| NA | Field Relation not required |
| REL_FIELDS_1 | Field of previous frame ($T_{n-1}$, $B_{n-1}$) are strongly related (or similar) as compared to fields of current frame ($T_n$, $B_n$) |
| REL_FIELDS_2 | Field of current frame ($T_n$, $B_n$) are strongly related (or similar) as compared to fields of previous frame (Tn − 1, $B_{n-1}$) |

In one embodiment, the field relations ($F_{Relation}$) are calculated between the fields Tn−1, $B_{n-1}$ and $T_n$, $B_n$. The Field relation are computed based on the previous frame (Tn−1, $B_{n-1}$) and the current frame ($T_n$, $B_n$). For example, if both the fields are same then the field relation are marked as NA, since it will not affect the state machine. In an example, the difference between the Tn−1, Bn−1, and Tn, Bn−1 shows that the fields of the previous frame ($T_{n-1}$, $B_{n-1}$) are strongly related as compared to the fields of the current frame (Tn, Bn−1), hence they are marked as related field as 1 (REL_FIELDS_1). In another example, the field are taken as Tn−1, Bn, Tn, Bn. It shows the difference between the previous frame and the current frame shows that the field of current frame (Tn, Bn) are strongly related as compared to fields of previous frame (Tn−1, Bn), hence they are marked as related field as 2 (REL_FIELDS_2).

Figure 4:
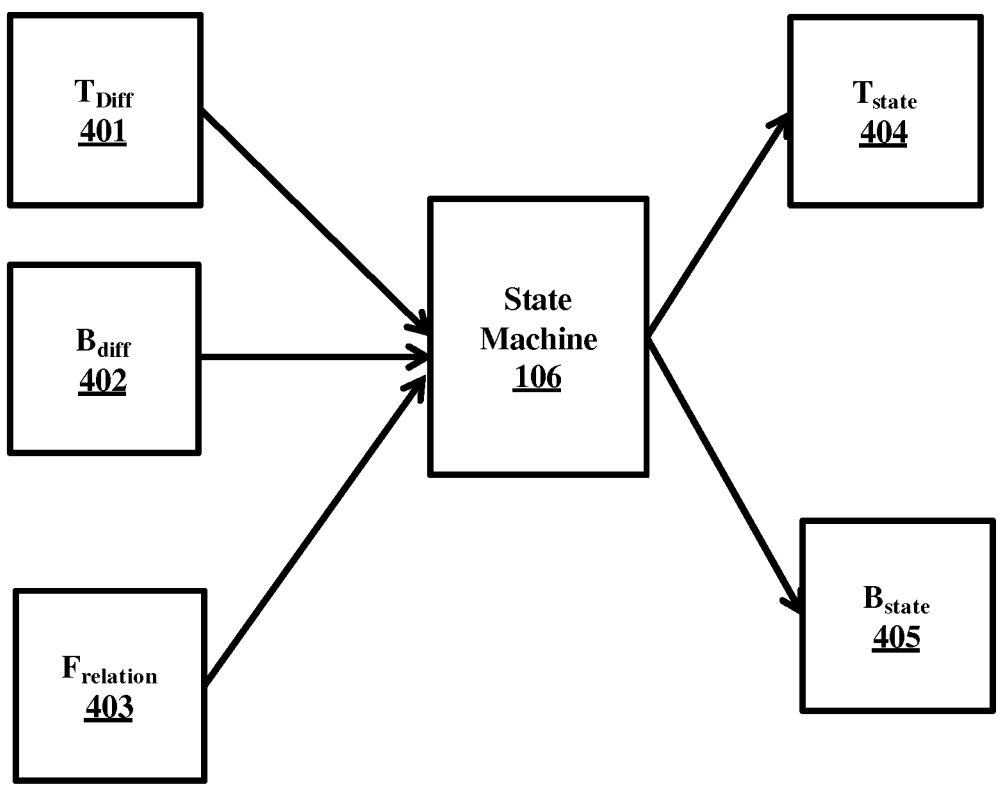
FIG. 4 illustrates the function of state machine module, according to embodiments as disclosed herein.

FIG. 4 illustrates the function of state machine module, according to embodiments as disclosed herein. As depicted in the figure, from the field difference

TABLE 3

| | Field States | |
|---|---|---|
| State | Mapped Number | Field Representation |
| OUTSIDE STATE | 1 | ∣ |
| START STATE | 2 | L, ⌐ |
| IN BETWEEN STATE | 10/29 | /, \ |
| END STATE | 4 | ⌐, ¬, = | analyzer module 105 the $T_{Diff}$ 401, $B_{Diff}$ 402 and $F_{Relation}$ 403 are passed as input into the state machine module 106 which returns the field states $T_{state}$ 404 and $B_{state}$ 405 as output. The state machine produces one out of four states such as outside state, start state, in between state and end state for each field, as shown in Table 3.

In one embodiment, the outside state are determined when there is a difference between the top fields and the bottom fields and represented by the symbol ∣. The start state is represented by two symbols in which the first symbol L represents that the top fields have difference and the bottom field is repeated. And the second symbol ⌐ represents the top field is repeated and the bottom field have difference. If any of this state occurs then it is called as start state and marked as the beginning of the cadence pattern. If both the previous top and bottom fields are different then the state corresponds to in-between states and represented by the symbols/\ respectively. The difference between the outside state and the in between state is that, in between state comes after the start state and before the end state and outside lies outside the start state. In the case of end state the symbols ⌐ denotes the bottom fields are repeating and the top fields has difference. The second symbol ¬ denotes the top fields are repeating and the bottom fields have difference. And third symbol=denotes both the top and bottom fields are repeated. The state machine computes the state of each frame based on the abovementioned calculations.

In one embodiment, the state machine determines the start state and end state by using the field relationship. For example, the first symbol of both the start and end state is taken and it infers that in both the symbols the bottom fields are repeated but the top fields have difference. In order to show the start state or the end state the state machine checks the field relationship. If the relationships turn out to be 1 (REL_FIELDS_1) then the state machine determines it is the start state and if the relationship turns out to be 2 (REL_FIELDS_2) then the state machine knows it is the end state.

Figure 5:
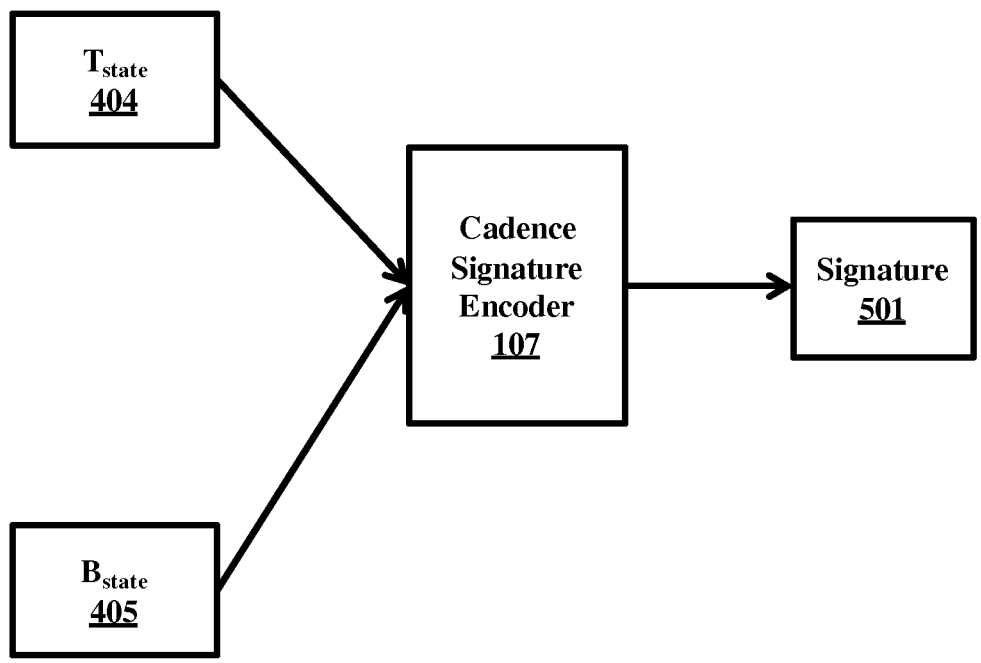
FIG. 5 illustrates the process of generation of signature in the cadence signature encoder module, according to embodiments as disclosed herein.

FIG. 5 illustrates the process of generation of signature in the cadence signature encoder module, according to embodiments as disclosed herein. The cadence signature is generated from the $T_{State}$ and $B_{State}$, with the help of cadence signature encoder module 107 that uses the following function for signature generation.

$$\text{Signature} = (T_{State} << 4) | B_{State}$$

The above function determines the cadence signature from mathematical calculation of the $T_{State}$ multiplied by the 2 raised to the power of 4 and adds that with $B_{State}$. The cadence signature is generated for each and every frame in the video. Below is the table 4 that shows all the encoded cadence signatures (as well as their field representation) that are generated from the field states generated by the state machine.

TABLE 4

| | | Encoded Cadence Signatures | | | | | | | |
|---|---|---|---|---|---|---|---|---|---|
| TState | B = Bstate T = TState<<4 | OUTSIDE (1) | | START (2) | | IN BETWEEN (3) | | END (4) | |
| | | Signature = T∣B | | | | | | | |
| OUTSIDE (1) | 16 | 17 | ∣ | 18 | L | 19 | NA | 20 | NA |
| START (2) | 32 | 33 | NA | 34 | NA | 35 | ⌐ | 36 | NA |
| N BETWEEN (3) | 48 | 49 | NA | 50 | NA | 51 | / or \ | 52 | ⌐ |
| END (4) | 64 | 65 | ¬ | 66 | NA | 67 | NA | 68 | = |

In an example, cadence signature 18 (L) indicates that 2 fields have been converted into 3 by repeating the bottom field. The cadence signature of 18 is generated in the cadence signature encoder module using the function as mentioned below Signature=(1*2^4)+2=18 which is a start state In another example, table 5 below shows the signatures generated for a 2:3 cadence sequence.

TABLE 5

Generated signatures for a 2:3 cadence sequence

| Top Field | T1 | T2 | T3 | T4 | T4 | T5 | T6 | T7 | T8 | T8 | T9 | T10 |
|---|---|---|---|---|---|---|---|---|---|---|---|---|
| Bottom Field | B1 | B2 | B2 | B3 | B4 | B5 | B6 | B6 | B7 | B8 | B9 | B10 |
| Signature | | 17 | 18 | 51 | 65 | 17 | 17 | 18 | 51 | 65 | 17 | 17 |

Figure 6:
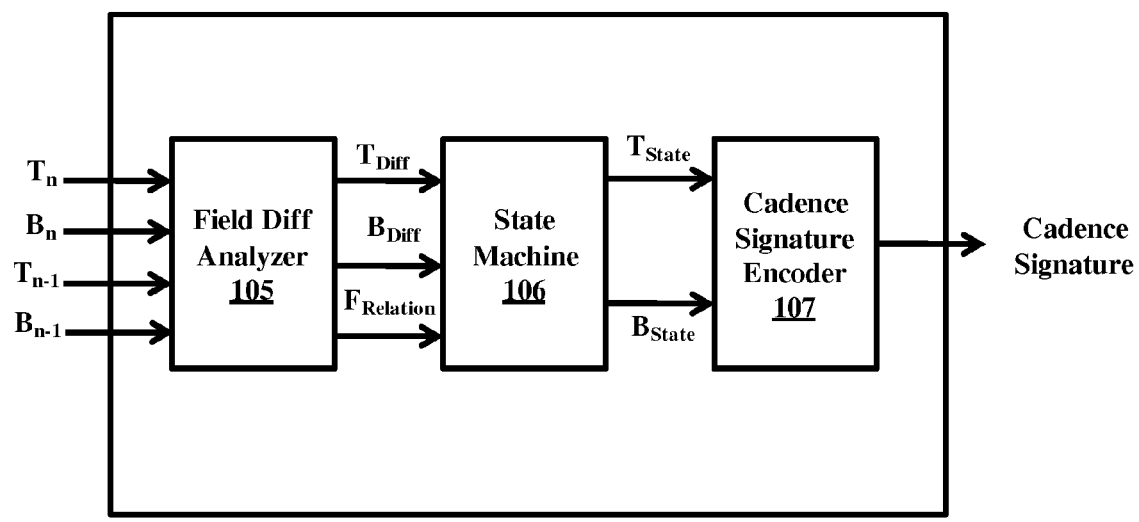
FIG. 6 illustrates the overall process of generating the cadence signature, according to embodiments as disclosed herein.

FIG. 6 illustrates the overall process of generating the cadence signature, according to embodiments as disclosed herein. As depicted in the figure, the current top ($T_n$) and bottom fields ($B_n$) and the previous top ($T_{n-1}$) and bottom fields ($B_{n-1}$) are given as input to the field difference analyzer module 105 which generates the difference between the top fields ($T_{Diff}$) and bottom fields ($B_{Diff}$) along with the field relationship ($F_{Relation}$) between the fields. The $T_{Diff}$, $B_{Diff}$ and $F_{Relation}$ are passed as input to the state machine module 106 which generates the state of the top ($T_{State}$) and bottom fields ($B_{State}$). Then the top state and bottom state are passed to the cadence signature encoder module 107 that generates the cadence signature based on the states of top and bottom fields. Each of the cadence signatures has data and when passed into the data analyzer module for analysis.

Figure 7:
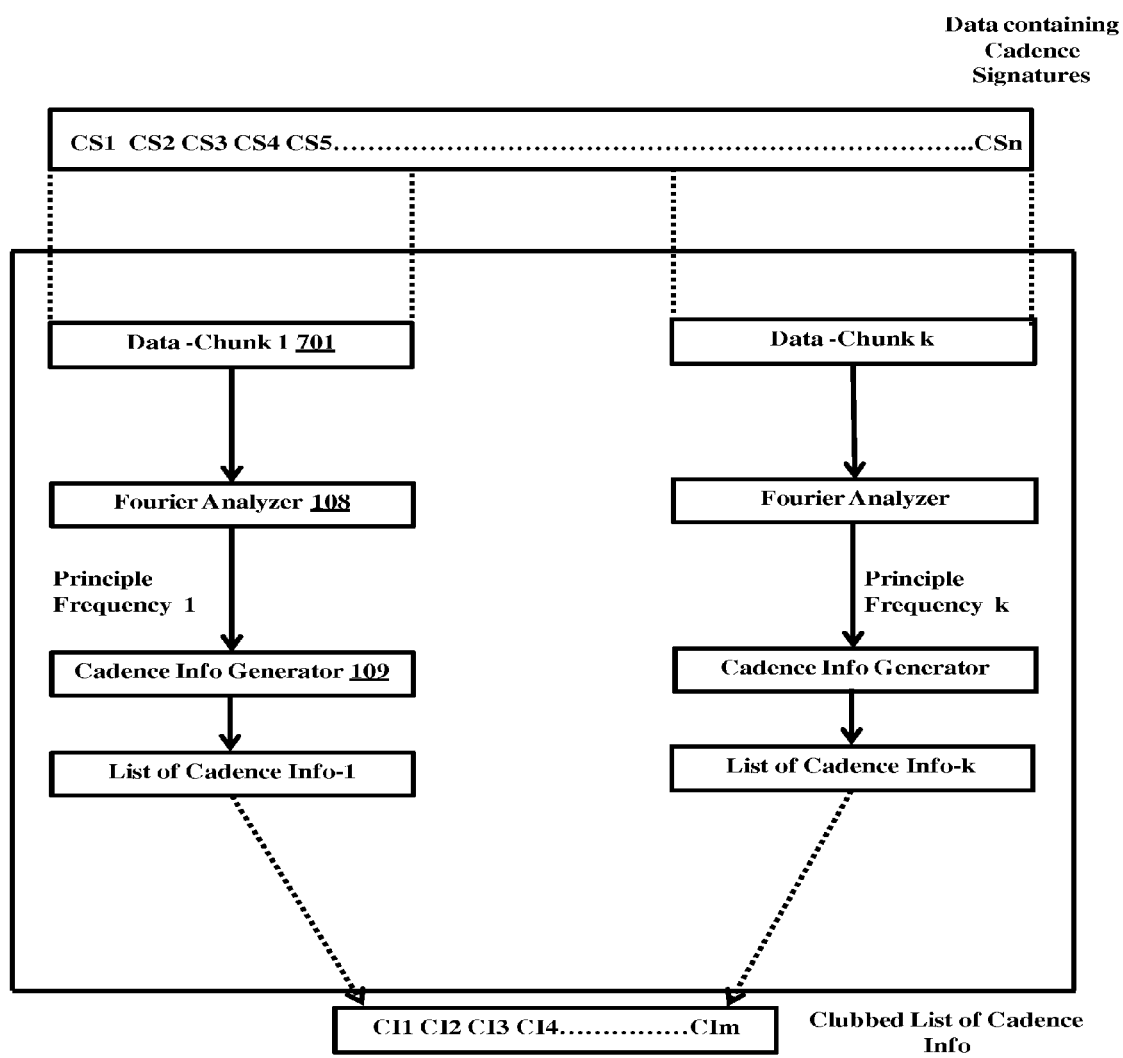
FIG. 7 illustrates the function of Data Analyzer module, according to embodiments as disclosed herein.

FIG. 7 illustrates the function of Data Analyzer module, according to embodiments as disclosed herein. As depicted in the figure, the list of cadence signatures generated by using the cadence signature generator module that contains the cadence signatures at each frame, is passed to the data analyzer module 103, which analysis it and returns the list of cadence info nodes. To get the accurate cadence info the list of cadence signatures (data's) are divided into data chunks-1 701. Page: 14 In an embodiment, an edited stream may contain number of sequences (which have different cadence pattern) merged together. For example, a 3:2 stream may contain an 2:2:2:4. Thus applying Fourier transform on the entire data chunk may provide multiple peaks in Fourier spectrum to signify multiple repeating cadence signature patterns. The identification of frequency corresponding to a particular cadence signature pattern would be quite difficult and may be misleading. Additionally, it is very difficult to find out the location at which the cadence signature pattern has changed. To overcome such a problem, the data is divided into smaller data chunk, so that the principle frequency is calculated for each chunk independently, instead of calculating it for the entire data at one go. This makes the calculation and analysis more accurate and easy. Also, this approach will help in finding out the location of change in cadence signature pattern. For example, the list of 1024 cadence signatures is divided into (512, 512) data chunks. Then the data chunks is passed to the Fourier analyzer module 108 where it performs Fourier transform and returns the principle frequency for repetition of cadence signature sequence. Then on the basis of principle frequency returned by the Fourier analyzer module 108, the list of cadence info is generated by the cadence info generator module 109 for the data chunk. The list of cadence info is generated for each of the data chunk and is finally clubbed and returned back by the data analyzer module.

Below is an example that shows the principle frequency generated as result of Fourier analysis Bottom Field
Signature
Repeating Pattern (Cadence Signature Pattern) 17 18 51 65 17
Principle Frequency 5

In the above example the principle frequency is determined by checking the sequence of five signatures (17 18 51 65 17) being repeated after every $5^{th}$ signature.

Further, from the principle frequency the cadence info is generated by the cadence info generator module. In one embodiment, the list of cadence info can be depicted in the below table-5. List of cadence info are generated as the output from the cadence info generator module.

TABLE 5

Structure of Cadence Information Node
CADENCE INFO

Previous Cadence Pattern Signature Sequence
Current Cadence Pattern Signature Sequence
Frame Location for Start of Current Cadence Pattern Signature
Repetition count of current Pattern For example, by considering the above example (17 18 51 65 17) the cadence info of previous cadence pattern signature sequence will be null since it is the first cadence pattern, Current cadence pattern signature sequence will be 17 18 51 65 17, Frame location for start of current cadence pattern signature sequence will be frame number 1 and repetition count of current pattern will be as much as repetitions encountered. Further, when some new pattern is encountered, then for the new pattern the previous pattern is the current 17 18 51 65 17 pattern. Then the current pattern is again identified for the new pattern and the repetition count is noted. Each cadence info node is an independent entity and so, it can be independently used to detect cadence change in case of any change.

In an embodiment, Fourier analysis helps in accurate sequence identification and matching. Using Fourier analysis the principle frequency is generated. Further, employing this principle frequency a matching of the current pattern with the next pattern is done. As long as a match is obtained an increase is performed with repetition count on the current pattern. If no match is obtained, then principle frequency minus 1 up to the lowest count (i.e., 2) is checked for the match. If no results, then from principle frequency plus 1 to the maximum count is checked. If there are no matches yet, a single entry is added to the table. In this fashion, the matching patterns are identified. The method helps to analyze complex patterns and identifying matches for them.

Figure 8:
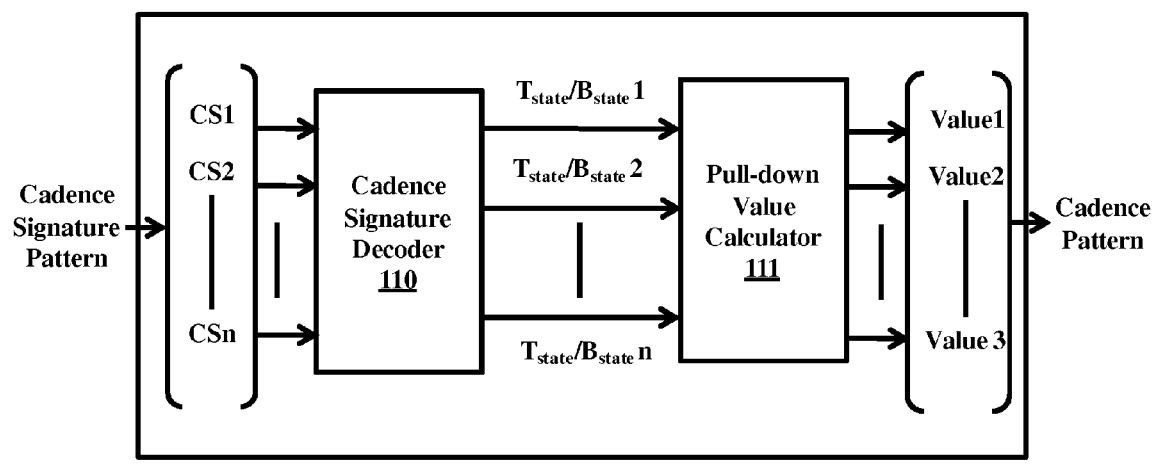
FIG. 8 illustrates the function of Cadence Pattern Estimator module, according to embodiments as disclosed herein.

FIG. 8 illustrates the function of Cadence Pattern Estimator module, according to embodiments as disclosed herein. From the cadence info which contains the cadence signature pattern, the cadence signature decoder module 110 decodes the signature to find the actual cadence pattern. For example, the cadence pattern signature sequence 17 18 51 65 17 is decoded to find the actual cadence pattern. As depicted in the figure, the cadence signature decoder module 110 takes cadence signature as input and provides the state specific to each of the top and bottom fields that were encoded by the cadence signature encoder to generate the cadence signatures. This mod-

| Top Field | T1 | T2 | T3 | T4 | T4 | T5 | T6 | T7 | T8 | T8 | T9 | T10 | T11 | T12 | T12 | T13 |
|---|---|---|---|---|---|---|---|---|---|---|---|---|---|---|---|---|
| | B1 | B2 | B2 | B3 | B4 | B5 | B6 | B6 | B7 | B8 | B9 | B10 | B10 | B11 | B12 | B13 | ule works as an inverse of cadence signature encoder and generates the field states by using the below function.

$T_{State}=(\text{Signature}>>4)\ \&\ 0xF$ $B_{State}=\text{Signature}\ \&\ 0xF$ Then the $T_{State}$ and $B_{State}$ are given to the pull-down value calculator module 111 to find the actual pull-down value from which the actual cadence pattern is estimated. The pull-down value calculator module uses the field states for the estimation of the pull-down value. A state-machine is internally used for the generation of the sequence of pull-down value. The state machine handles the following cases shown in table-6 for the estimation of pull-down value.

TABLE 6

Normal Pull-down value calculator

| Top Field State | Bottom Field State | Field Representation | Sequence Type | Pull Down Value |
| --- | --- | --- | --- | --- |
| OUTSIDE STATE | OUTSIDE STATE | \| | Outside | 2 |
| OUTSIDE STATE | START STATE | L | Start | 3 |
| OUTSIDE STATE | IN BETWEEN STATE | NA | | — |
| OUTSIDE STATE | END STATE | NA | | — |
| START STATE | OUTSIDE STATE | NA | | — |
| START STATE | START STATE | NA | | — |
| START STATE | IN BETWEEN STATE | ⌈ | Start | 3 |
| START STATE | END STATE | NA | | — |
| IN BETWEEN STATE | OUTSIDE STATE | NA | | — |
| IN BETWEEN STATE | START STATE | NA | | — |
| IN BETWEEN STATE | IN BETWEEN STATE | /, \ | In-Between | 2 |
| IN BETWEEN STATE | END STATE | ⌋ | End | 3 + x, x >= 0 |
| END STATE | OUTSIDE STATE | ⌐ | End | 3 + x, x >= 0 |
| END STATE | START STATE | NA | | — |
| END STATE | IN BETWEEN STATE | NA | | — |
| END STATE | END STATE | = | End | 4 + x, x >= 0 |

The state machine applies some smart logic for handling of end sequences. Once the end state is encountered the pull-down value calculation is not over at that time. The algorithm checks the end-sequence pull-down value calculator in calculating the pull-down value for the end sequence. The algorithm employs the look-up table-7 in calculating the pull-down value for the end sequence.

The end-sequence pull-down calculator works on both previous as well as current pull down value as opposed to normal pull-down value calculator which works only on the current pull down value. The end-sequence pull down calculator is used once the end sequence is encountered and it keeps on working until a non-end sequence arrives. Table-8 below shows the end sequence pull-down value calculator. Table-6 and Table-7 are used for decoding the cadence signature to get actual cadence pattern.

TABLE 7

End-sequence Pull-down value calculator

| Top Field State | Bottom Field State | Field Representation | Sequence Type | Pull Down Value |
| --- | --- | --- | --- | --- |
| OUTSIDE STATE | OUTSIDE STATE | \| | Outside | Prev Value += 0 |
| OUTSIDE STATE | START STATE | L | Start | Prev Value += 1 |
| OUTSIDE STATE | IN BETWEEN STATE | NA | | — |
| OUTSIDE STATE | END STATE | NA | | — |
| START STATE | OUTSIDE STATE | NA | | — |
| START STATE | START STATE | NA | | — |
| START STATE | IN BETWEEN STATE | ⌈ | Start | Prev Value += 1 |
| START STATE | END STATE | NA | | — |
| IN BETWEEN STATE | OUTSIDE STATE | NA | | — |
| IN BETWEEN STATE | START STATE | NA | | — |
| IN BETWEEN STATE | IN BETWEEN STATE | NA | | — |
| IN BETWEEN STATE | END STATE | ⌋ | End | Prev Value += 0<br>Curr value = 3 + y, y >= 0 |
| END STATE | OUTSIDE STATE | ⌐ | End | Prev Value += 0<br>Curr value = 3 + y, y >= 0 |
| END STATE | START STATE | NA | | — |
| END STATE | IN BETWEEN STATE | NA | | — |
| END STATE | END STATE | = | End | Prev Value += 2 + y, y >= 0 |

In an embodiment, considering the example of decoding 17, 18, 51, 65, 17. Here the start 17 is divided 2^4 the remainder is 1 which indicates B state and the quotient is 1 which stands for the Tstate. Referring to the table 3 and tables 6 and 7 the pull down value sequence is obtained. For the next number 18 the Bstate is 2 and Tstate is 1, for 51 Bstate is 3 and Tstate is 3 and for 65 Bstate is 1 and Tstate is 4. Using the above computations and tables 3, 6 and 7 we obtain the sequence to be 2:3:2:3 (i.e., 2:3).

Figure 9:
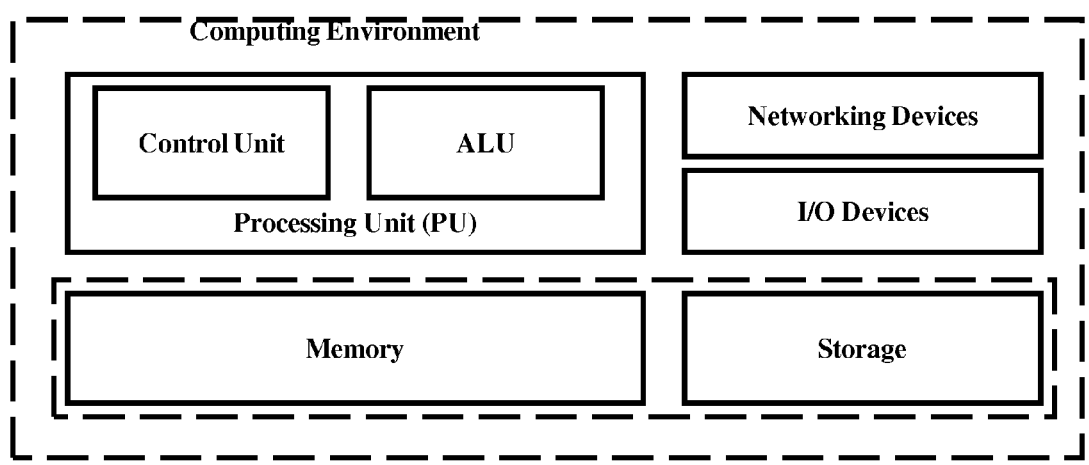
FIG. 9 illustrates an example computing environment that may be used in implementing the embodiments disclosed herein.

FIG. 9 illustrates an example computing environment that may be used in implementing the embodiments disclosed herein. As depicted the computing environment comprises at least one processing unit that is equipped with a control unit and an Arithmetic Logic Unit (ALU), a memory, a storage unit, plurality of networking devices, and a plurality Input output (I/O) devices. The processing unit is responsible for processing the instructions of the algorithm. The processing unit receives commands from the control unit in order to perform its processing. Further, any logical and arithmetic operations involved in the execution of the instructions are computed with the help of the ALU. Processing unit can support more than one threads.

The overall computing environment can be composed of multiple homogeneous and/or heterogeneous cores, multiple GPUs of different kinds, special media and other accelerators. The processing unit is responsible for processing the instructions of the algorithm. The processing unit receives commands from the control unit in order to perform its processing. Further, any logical and arithmetic operations involved in the execution of the instructions are computed with the help of the ALU. Further, the plurality of process units may be located on a single chip or over multiple chips.

The instructions and codes required for the implementation are stored in either the memory unit or the storage or both. At the time of execution, the instructions may be fetched from the corresponding memory and/or storage, and executed by the processing unit.

In case of any hardware implementations various networking devices or external I/O devices may be connected to the computing environment to support the implementation through the networking unit and the I/O device unit.

Advantages

Bifurcation of Freeze Frame Sequences

With this method, the freeze frame sequences may be easily bifurcated from real Telecined sequences for example, 4-4 pattern-induced sequences. This is so because of the different encoded cadence pattern signatures sequence as identified for Telecined and freezed sequences (Signature for freeze sequence=68-68- . . . , Signature of 4-4 sequence=68-17-68-17- . . . ).

Detection of Large Cadence Patterns

A normal pattern detection algorithm would have detected the pattern, 2-2-2-2-2-2-2-2-2-2-2-2-2-2-2-2-2-2-2-2-2-2-2-2-4, as 2-2 pattern with a break after 12 repetitions. But since the application uses Fourier transform to detect the principle frequency of the repetition, the algorithm can easily detect large patterns as well.

Detection of Complex Patterns

The method uses the state machine to generate the state of each field belonging to a frame depending only on the fields in the previous and current frames, the application may be used for the detection of even complex patterns.

No Learning is Required by the System

The method uses the current state of field for generation of cadence signatures and therefore no learning is required by the system.

Implementation of a Generic Algorithm

This method deals with the implementation of a generic algorithm, so, the algorithm has not been specialized for detection of only a few particular cadence pattern. It can be used in detection of any cadence pattern present with-in the stream.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiment disclosed herein specifies a system for identifications and analysis of cadence pattern in the video. The mechanism allows identifying and analyzing cadence pattern providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the application may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

We claim:

1. A method for cadence sequence identification and analysis in a video stream, said method comprising:

encoding cadence signature for output data obtained from a state machine by a cadence signature generator module;

analyzing said encoded cadence signature output from said cadence signature generator module by a data analyzer module; and decoding said signature and identifying repeating cadence pattern in said signature by a cadence pattern estimator module, wherein said decoding the signature and said identifying the pattern comprises the steps of:

employing a cadence signature decoder module that takes cadence pattern signature sequence as input and decodes each said cadence signature pattern to obtain field states; and employing a Pull-down value calculator for estimating said pull down value by using a state machine and a look up table on the field states.

2. The method as in claim 1, wherein said method employs said cadence signature generator for encoding cadence signature by:

computing difference between top and bottom fields and field relation for frames using a field difference analyzer;

calculating field states for said top and bottom fields using a state machine; and generating encoded cadence signature from said field states by using a cadence signature encoder.

3. The method as in claim 2, wherein said computing comprises obtaining pixel level difference between said top and bottom fields separately for current fields and previous fields by said field difference analyzer.

4. The method as in claim 2, wherein said computing comprises obtaining relationship between said top and said bottom fields for said current frame by said field difference analyzer.

5. The method as in claim 2, wherein said calculating comprises obtaining said field states by employing output of said field difference analyzer.

6. The method as in claim 2, wherein said state machine generates one among a state that includes: outside state, start state, in-between state and end state.

7. The method as in claim 2, wherein said generating comprises obtaining encoded cadence signatures and their field representations from said field states generated by said state machine.

8. The method as in claim 1, wherein said method employs said data analyzer module configured for analyzing said cadence signatures by: dividing said signatures into data chunks; performing Fourier analysis on said data chunks for computing principle frequency of said repeating pattern in said data chunks; and generating cadence information from said analyzed data chunks.

9. The method as in claim 8, wherein said cadence information indicates at least one of: previous cadence pattern signature sequence, current cadence pattern signature sequence, frame location for current cadence pattern signature sequence and repetition count of said current pattern signature sequence.

10. The method as in claim 1, wherein said pull down value gives the actual cadence pattern.

11. The method as in claim 1, wherein said decoder takes cadence signature as input and provides the states specific to each of the top and bottom fields.

12. The method as in claim 1, wherein said look-up tables are used by the state machine for pull down value estimation.

13. A system for cadence sequence identification and analysis in a video stream, said system provided with at least one means configured for:

encoding cadence signature for output data obtained from a state machine by a cadence signature generator module;

analyzing said encoded cadence signature output from said cadence signature generator module by a data analyzer module; and decoding said signature and identifying repeating cadence pattern in said signature by a cadence pattern estimator module, wherein said cadence pattern estimator module comprises a cadence signature decoder module that takes cadence pattern signature sequence as input and decodes each said cadence signature to obtain field states; and a Pull-down value calculator for estimating said pull down value by using a state machine and look up tables on the field states.

14. The system as in claim 13, wherein said system is configured for encoding cadence signature by:

computing difference between top and bottom fields and field relation for frames using a field difference analyzer;

calculating field states for said top and bottom fields using a state machine; and generating encoded cadence signature from said field states by using a cadence signature encoder.

15. The system as in claim 14, wherein said system is configured for obtaining pixel level difference between said top and bottom fields separately for current fields and previous fields by said field difference analyzer.

16. The system as in claim 14, wherein said system is configured for obtaining relationship between said top and said bottom fields for said current frame by said field difference analyzer.

17. The system as in claim 14, wherein said system is configured for calculating said field states by employing output of said field difference analyzer.

18. The system as in claim 14, wherein said system is configured for employing said state machine that generates one among a state that includes: outside state, start state, in-between state and end state.

19. The system as in claim 14, wherein said system is configured for generating encoded cadence signatures and their field representations from said field states generated by said state machine.

20. The system as in claim 13, wherein said system is configured for analyzing said cadence signatures by: dividing said signatures into data chunks; performing Fourier analysis on said data chunks for computing principle frequency of said repeating pattern in said data chunks; and generating list of cadence information from said analyzed data chunks.

21. The system as in claim 20, wherein said system is configured for generating said cadence information, where said information indicates at least one of: previous cadence pattern signature sequence, current cadence pattern signature sequence, frame location for current cadence pattern signature sequence and repetition count of said current pattern signature sequence.

22. The system as in claim 13, wherein said pull down value gives the actual cadence pattern.

23. The system as in claim 13, wherein said decoder takes cadence signature as input and provides the states specific to each of the top and bottom fields.

24. The system as in claim 13, wherein said wherein said look-up tables are used by the state machine for pull down value estimation.

25. A method for cadence sequence identification and analysis in a video stream, said method comprising:

encoding cadence signature for output data obtained from a state machine by a cadence signature generator module, wherein encoding the cadence signature comprises the steps of:

computing difference between top and bottom fields and field relation for frames using a field difference analyzer;

calculating field states for said top and bottom fields using a state machine; and generating encoded cadence signature from said field states by using a cadence signature encoder;

analyzing said encoded cadence signature output from said cadence signature generator module by a data analyzer module; and decoding said signature and identifying repeating cadence pattern in said signature by a cadence pattern estimator module.

26. A system for cadence sequence identification and analysis in a video stream, said system provided with at least one means configured for:

encoding cadence signature for output data obtained from a state machine by a cadence signature generator module, wherein said cadence signature generator module comprises of:

a field difference analyzer for computing difference between top and bottom fields and field relation for frames;

a state machine for calculating field states for said top and bottom fields; and a cadence signature encoder for generating encoded cadence signature from said field states;

analyzing said encoded cadence signature output from said cadence signature generator module by a data analyzer module; and decoding said signature and identifying repeating cadence pattern in said signature by a cadence pattern estimator module.

\* \* \* \* \*